United States Patent [19]

Eigenmann

[11] 4,012,114
[45] Mar. 15, 1977

[54] HIGH EFFICIENCY REFLECTING SYSTEM, AND METHOD

[76] Inventor: Ludwig Eigenmann, Vacallo, Ticino, Switzerland

[22] Filed: May 19, 1975

[21] Appl. No.: 578,922

[30] Foreign Application Priority Data

May 20, 1974 Italy ................................ 22963/74

[52] U.S. Cl. .............................. 350/104; 350/105; 350/175 GN; 404/14
[51] Int. Cl.² .......................................... G20B 5/22
[58] Field of Search ............. 350/104, 97, 99, 100, 350/95, 105, 175 GN; 404/10, 11, 14, 16

[56] References Cited

UNITED STATES PATENTS

| | | | |
|---|---|---|---|
| 2,713,286 | 7/1955 | Taylor | 350/105 |
| 3,284,722 | 11/1966 | Gray | 350/175 GN |
| 3,637,285 | 1/1972 | Stewart | 350/105 |
| 3,781,083 | 12/1973 | Eigenmann | 350/105 |

Primary Examiner—John K. Corbin
Assistant Examiner—B. Wm. de los Reyes
Attorney, Agent, or Firm—Michael J. Striker

[57] ABSTRACT

There is described an optical system suitable for use on highway pavements or marking indicia for ensuring nighttime visibility, and consisting of a transparent sphere, a transparent layer of a binding medium having a refractive index different from that of the sphere, and partially surrounding said sphere, and a plurality of reflective part-spherical surfaces about such medium. The system has an optical transition zone between said sphere and said binding medium, consisting of a transparent layer of finite thickness wherein the index of refraction progressively varies from a value equal to that of the sphere, at locations adjacent to the sphere, to a value equal to that of said medium, at locations adjacent to the layer of said medium, whereby the refractive deviation of the light rays from the media (sphere and binding medium) having different refractive indexes occurs through said intermediate layer in form of a progressively curved path.

7 Claims, 5 Drawing Figures

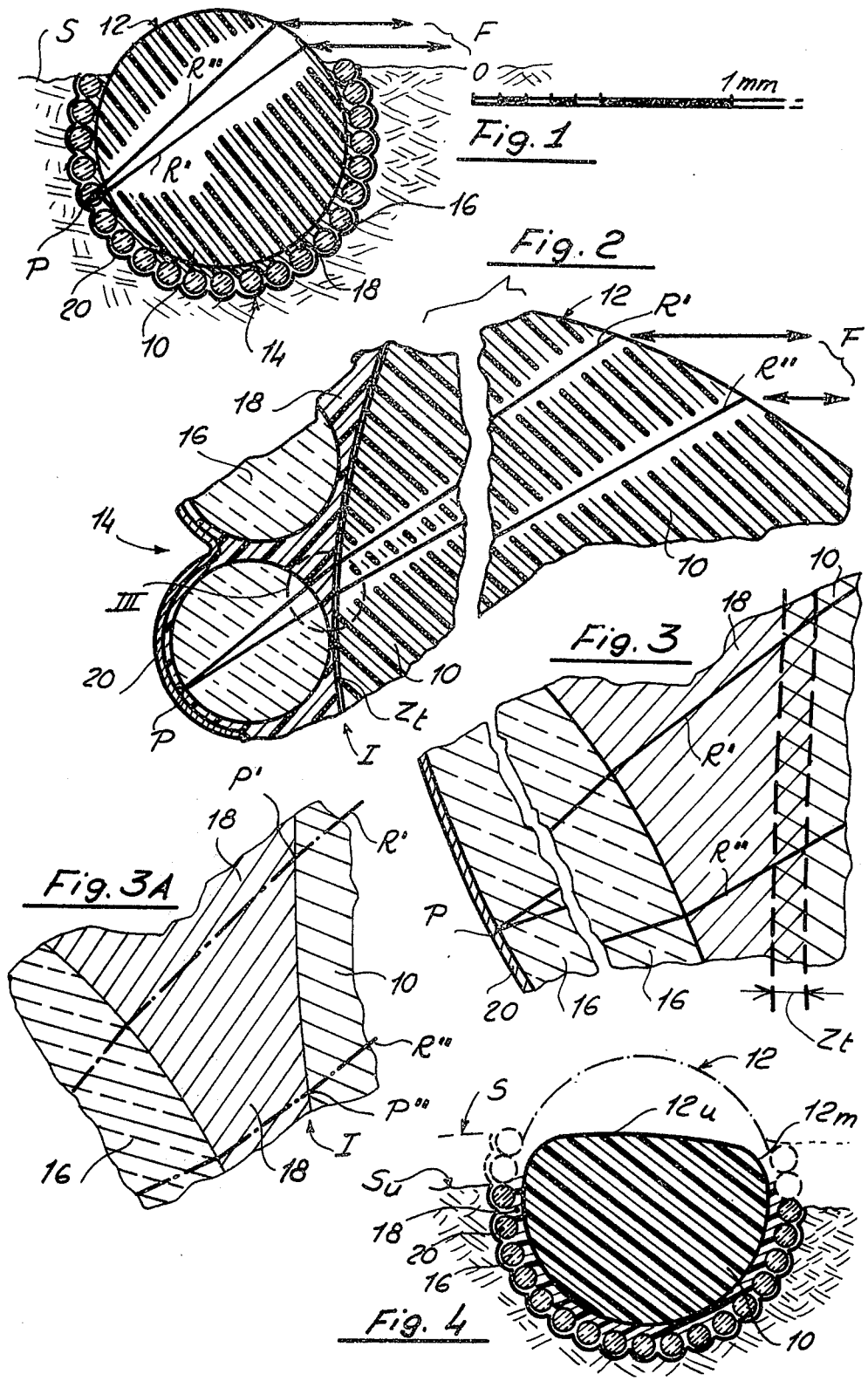

HIGH EFFICIENCY REFLECTING SYSTEM, AND METHOD

BACKGROUND OF THE INVENTION

1. The Field of the Invention

The present invention relates to a light reflecting system particularly suitable for use in highway marking for reflectorizing and therefore imparting nighttime visibility to traffic regulating indicia, such as traffic lane dividing lines and the like. The light reflecting system of the invention appertains to the class of the reflex-reflecting composite elements or collinear reflectors, both such terms having been accepted and widely used in the recent patent and scientific literature for defining optical means having a face exposed to light and capable of reflecting a ray of light back to its source along its own incident path irrespective (within practical limits) of the angle of incidence.

2. The Prior Art

A reflecting system of the above class comprises at least one substantially transparent, substantially spherical element acting as a primary condensing lens, having a refractive index such that a beam of light impinging said element is refracted and at least partially focused regardless of the angle of impingement; a substantially transparent binding medium contacting and partially surrounding said element so that a portion of said element is exposed for impingement by beams of light and a portion of said element is surround by said binding medium, and reflecting means for the further focusing and the reflection of light beams which pass through said element and binding medium, said reflecting means consisting at least almost entirely of reflective substantially part-spherical surfaces which are formed or secured about the surrounded portion of said element and which are spaced from the spherical surface of said element by said binding medium.

Reflecting systems as above have been extensively discussed in my prior British Patent Specification No. 1,343,196.

For simplicity of manufacture, said reflecting systems are made as entirely globular aggregates, wherein the spherical element is completely surrounded by the binding medium and reflecting means. Such aggregates are at least partially embedded within a layer of a settable composition, painted or otherwise deposited on a surface to form retroreflecting areas, as well known in the art. When the layer composition has set, the portions of said reflecting means and binding medium, bulging from the surface of the set layer, are removed such as by brushing off or by the erasing process exerted by the vehicle traffic over said areas, so that the corresponding bulging portions of the spherical elements will become exposed for light beam impingement. The system of the invention will be herein described and compared with the prior art in its latter "service" condition, irrespective of its above "manufacture" condition.

Reflectors of the retroreflecting type are generally employed where the incident beam strikes a reflecting surface which is otherwise in partial or total darkness. In particular, retroreflecting surfaces are used on highway marking signs and advertising signs. In such cases, it is absolutely essential that the reflected light is trasmitted back to the source of the incident light, even through the incident light might strike the reflecting surface at an angle. In the case of a highway sign it is also necessary that a maximum amount of brilliancy is retained so that the sign may be visible from a suitable distance and may be clear enough to avoid any possible misinterpretation of its meaning.

This ability is of the greatest importance when the sign is formed on the roadway pavement, wherein the reflectors are impinged by "grazing" light and the retroflected light constitutes only a small fraction of the emitted light. A slight increase in such fraction might provide a sharp improvement in the "threshold distance" of visibility to the human eye. Thus, a search for an ever greater "optical efficiency" is a long felt want in the art.

Such optical efficiency (in terms of the ratio of the amount of impinging light to reflected light) can be improved both by improving the exactness of the focusing and by limiting the light losses when the light passes back and forth through the various transparent components of the system. Such losses are mainly caused by light dissipation and by the reflection, which occurs when a light ray passes through the interface between two transparent media, having different refractive indexes where the ray impinges said interface at an angle different from 90°.

With relation to the refractive indices of the various transparent components of the aggregate, the prior art has suggested that the spherical element generally be made of a glass the refractive index of which is between 1.46 and 1.65 and that the binding medium consist of a polymeric compound of refractive index from 1.35 to 1.50. The provision of binding medium having a refractive index noticeably below that of the spherical element contributes to improved focusing, because a better convergence of light beams is obtained at the "spherical element — binding medium" interface. On the other hand, such convergence leads to an undesirable loss of efficiency as a result of the increased light dissipation resulting from the reflection at said interface.

SUMMARY OF THE INVENTION

It is therefore a principal object of the present invention to provide a new and advantageous high efficiency retroreflecting system of the class referred to above, which is not subject to the above and other limitations.

More particularly, it is an object of this invention to provide a new retroreflecting system having a spherical primary focusing transparent element of a given first refractive index, a transparent binding medium having a second refractive index and partially surrounding said spherical element, and which is improved in that said element and medium do not contact each other and in that such element and medium are physically and optically interconnected by a transparent interfacial layer having a finite measurable thickness and forming an optical transition zone wherein the refractive index is progressively modified from a value equal to that of said element at locations adjacent to said element to a value equal to that of said binding medium, whereby a light ray passing through the said finite thickness of said optical transition zone is progressively deviated and follows a path having a curvature of finite radius which interconnects a first straight path in said element and a second straight path in said medium and along which no reflection occurs.

These and other objects, advantages and features of the invention, together with preferred modes for arranging the optical components and providing the systems, will be made apparent from the following detailed description taken together with the accompanying drawings.

THE SEVERAL VIEWS OF THE DRAWINGS

FIG. 1 is a rather diagrammatic diametral sectional view of a system according to the invention, the view being enlarged relative to the requisite current dimensions of the element, as apparent from a comparison with the millimeter scale forming part of the Figure;

FIG. 2 is a fragmentary similar view enlarged about ten times from that of FIG. 1 and including parts of all components of the system;

FIG. 3 is a further enlarged view (about one hundred times that of FIG. 1) of the detail included within the circle indicated at —III—in FIG. 2;

FIG. 3A corresponds to FIG. 3, except for the provision of the critical optical transition zone of the invention, said FIG. 3A being added for facilitating a comparision of the new system with the prior art; and FIG. 4 illustrates, in similar manner, the system of FIG. 1, in its severely worn out condition as occurs after extended service on a highway pavement.

DETAILED DESCRIPTION OF THE PREFERRED EMBODIMENT

Referring first to FIG. 1, it is pointed out that, as far as the system has parts and features common to those of prior art retrocollimators, the system comprises a spherical or nearly spherical transparent element 10 which, in service, has an uncoated portion 12 bulging above the surface S of a roadway pavement or, more commonly, of a traffic regulating sign formed upon such pavement. The remaining portion of the sphere 10 is sorrounded by a reflective arrangement generally indicated at 14 and made, in the embodiment shown, of a monolayer of beads 16 partially embedded within a transparent binding medium 18. The system is reflectorized by an inwardly reflective coating 20 of silver or of aluminum applied, by a suitable well known procedure, to the outer part-spherical surfaces of the beads 16 to complete the optical arrangement. Generally, the diameter of said element 10 is 0.4 to 1.5 mm, systems comprising much larger elements 10 being feasible and sometimes desired, however.

In service, the portion 12 is impinged by light beams such as that indicated at F and defined by and between rays R' and R''. The element 10 is of a transparent material having a first reflective index such as to ensure a downward refraction of the rays and a first or primary focalization or convergence of the beam.

The binding medium 18 is also of transparent material and has a second refractive index such as to increase the convergence of the beam. The sub-system consisting of the binding medium 18 and the beads 16 provides a further or secondary focalization such as to cause the rays to converge or focus at a point P of the reflective part-spherical surface formed by the coating 20.

As far as the invention is concerned, the above applies also to a system wherein the sub-system for secondary focalization comprises, instead of the externally reflectorized beads 16 which form the reflective part-spherical surfaces, part-spherical surfaces which are convex in relation to element 10, which have their centers of curvature located substantially at the virtual foci (that is at points P) of the beams which pass through said binding medium, which are formed on the outer portion of said medium and which have their outer concave surfaces provided with the said reflectorizing coating.

In the prior art structures, the element 10 contacts the binding medium. Therefore an interface such as indicated at I in the prior art comparison FIG. 3A exists where the rays R' and R'' instantaneously pass from a first to a second transparent medium having different refractive indices, at points P' and P'', and said rays are accordingly sharply deviated, by refraction. Such refraction leads to an accompanying reflection (as well known in the optical art) that is to light dissipation, proportional to the angle at which the rays impinge from both sides of the interface I. The resulting efficiency drop is highly undesirable.

In the new system, this interface I is actually a transparent interfacial layer having a finite thickness, and forming an optical transistion zone Zt (FIG. 3) through which, even if the zone thickness is of the order of one or a few microns, the straight paths of the rays, in element 10, are connected by curves of finite and measurable (even if only by sophisticated optical procedures) radii of curvature, to the subsequent straight paths in the binding medium 18.

In FIG. 3 the "border faces" of said transition zone Zt are approximately indicated by heavily drawn phantom lines. The term (herein proposed) border faces indicates the faces, actually spherical surfaces, which bound a transparent material having a given refractive index at any point thereof. Through the transition zone Zt the refractive index varies, in direction perpendicular to said border faces, from that of the element 10 to that of the binding medium 18.

This critical fact is shown in FIG. 3 by the cross hatching of the area of the transition zone Zt which indicates that in such area the index of refraction is an average of those of the adjacent areas of element 10 and of binding medium 18.

The interfacial layer forming the transition zone is generally formed by a progressively decreasing interdiffusion of the material of element 10 (or of another transparent material having the first refractive index thereof) with the material of the binding medium 18 (or of a different transparent material having the second refractive index vice versa) and vice versa.

Several modes and procedures may be used for providing such critical optical transition zone, as described in the following Examples non-limiting. However, the manner of producing the remainder of the system which forms part of the current knowledge of the art and does not form part of the invention per se will not be described.

EXAMPLE I

The spherical elements 10 consist of polymethacrylate spheres of diameter from 0.4 to 1.5 mm, while the beads 16 consist of microspheres of diameter from 20 to 60 microns and are made of glass having a refractive index of 1.92; the binding medium consists of a suitable two-component (Isocyanate and Hydroxyl, preferably diphenyl methane 4,4'-diisocyanate) polyurethane resin. The polymerizable resin is compounded by mixing 43.5 parts by weight of the isocyanate and 100 parts by weight of the hydroxyl components while trichloroethylene in an amount corresponding to 10% about by weight of the binder is added to facilitate the interdiffusion of urethane polymer in the methacrylic polymer.

EXAMPLE II

Polystyrene spherical elements are surrounded by a polyurethane binding medium as in Example I, the polystyrene spheres having been preliminarily wetted with a solution of polystyrene in styrene monomer to which a suitable amount of polyurethane has been added.

Preferably, the said solution consists of (in parts by weight):

| | |
|---|---|
| styrene polymer | 14 percent |
| non-cross-linked polyurethane | 5 percent |
| styrene monomer | 40 percent |
| toluene | 40 percent |

EXAMPLE III

Polymethacrylate spherical elements are surrounded by a two-component polyurethane binding medium as above, with a little amount (3 percent by weight about) of the isocyanate component, and consisting of 49 parts by weight of hydroxyl component
100 parts by weight of isocynanate component, the said spherical elements having been preliminarily wetted with a solution consisting of (by weight):

| | |
|---|---|
| polymethylmethacrylate | 14 percent |
| hydroxyl component | 2 percent |
| trichloroethylene | 74 percent |

The provision of spherical elements made of a suitable hard, quite transparent and stress resisting resin substantially improves the service life-time of the system. Polystyrene is preferred and polymethacryalte is most preferred. Such resinous elements do not crack under impacts and although their bulging exposed portions are subject to progressive wearing off under the traffic, their thus worn surfaces maintain a smooth and glossy character and the ability to be transparent to the impinging light.

FIG. 4 diagrammatically exemplifies this fact. The original part-spherical surface 12 is progressively worn down to a flattened surface 12u having well rounded side portions 12m, exposed for light impingement and refraction upon loss of the upper beads, while the road pavement or sign surface is concurrently worn down from its original level S to a lower level Su.

It is evident that the invention has been hereinabove described with reference to a few examples thereof and that it is obvious to those skilled in the art that various changes may be made without departing from the spirit of the invention, by applying the foregoing teachings. This applies particularly to the manner of forming the critical optical transition zone between components having different refractive indices.

The combination "methacrylate - isocyanate" is generally preferred for forming the spherical element and the binding medium respectively, in view of the excellent transparency and resistance to wear and to stresses of the articles obtained from such compounds, and in view of the ability, found and experienced by to the invention, of non-cross-linked polyurethane resins mixed with suitable solvents or co-solvents, to provide a surface transient solution of polymethacrylate beads and spheres and to promote a progressively decreasing diffusion of the polyurethane under the surface of the polymethacrylate component to a depth sufficient to ensure the formation of the optical transition zone. A very wide number of compounds are available and the proper selection is a matter of simple experimentation.

On the other hand, the physical and optical bond between the components of the aggregate and the concurrent formation of the optical transistion zone can be provided by making use of solvents or co-solvents applied to the surface of the spherical element. Further, the binding medium having the second refractive index can be applied in molten condition about the spherical element to promote a brief surface melting or plasticizing of said element and consequent inter-diffusion of the abutting compounds.

Therefore the invention is not limited to what is shown in the drawings and described in the specification, but is limited only as indicated in the appended claims.

I claim:

1. A retroreflecting device, comprising at least one transparent, substantially spherical element having a first refractive index such that a ray impinging said element is refracted and at least partially focused regardless of the angle of impingement; reflecting means arranged to retroreflect rays which pass through said element; and a transparent medium securing said reflecting means to and spacing said reflecting means from said element, said medium including one portion which has a second refractive index different from said first refractive index, and said medium further including another portion which extends from said one portion to said element, said other portion of said medium having a refractive index at locations adjacent said element which substantially equals said first refractive index, and said other portion of said medium having a refractive index at locations adjacent said one portion of said medium which substantially equals said second refractive index, the refractive index of said other portion of said medium varying substantially progressively from said first refractive index to said second refractive index so that said other portion of said medium acts as an optical transition zone.

2. The device defined in claim 1, wherein said element comprises a transparent polymeric material.

3. The device defined in claim 2, wherein said medium is a binding medium which comprises a transparent polymeric substance capable of interdiffusing with said polymeric material.

4. The device defined in claim 3, wherein said element comprises a resin selected from the group consisting of polystyrene resins and polyacrylic resins and said binding medium comprises a polyurethane resin.

5. The device defined in claim 1, said element and said one portion of said medium each comprising a transparent polymeric material, and said other portion of said medium comprising a mixture of said materials; and wherein the ratio of said materials in said mixture varies substantially progressively in direction from said element to said one portion of said medium, said other portion of said medium consisting at least almost entirely of the material of said element at locations adjacent the latter, and said other portion of said medium consisting at least almost entirely of the material of said one portion of said medium at locations adjacent said one portion of said medium.

6. The device defined in claim 1, wherein said medium said medium only partially surrounds said element.

7. The device defined in claim 1, wherein said reflecting means consists at least almost entirely of substantially part-spherical reflective surfaces.

* * * * *